(12) United States Patent
Huang et al.

(10) Patent No.: US 11,570,005 B2
(45) Date of Patent: Jan. 31, 2023

(54) SYSTEMS AND METHODS FOR PROVING IMMUTABILITY OF BLOCKCHAINS

(71) Applicant: Digital Transaction Limited, Hong Kong (CN)

(72) Inventors: Ian Yuan Yuan Huang, Hong Kong (CN); Zhiqiang Ma, Hong Kong (CN)

(73) Assignee: Eternal Paradise Limited, Mahe (SC)

( * ) Notice: Subject to any disclaimer, the term of this patent is extended or adjusted under 35 U.S.C. 154(b) by 328 days.

(21) Appl. No.: 16/827,339

(22) Filed: Mar. 23, 2020

(65) Prior Publication Data

US 2021/0297265 A1 Sep. 23, 2021

(51) Int. Cl.
| | | |
|---|---|---|
| *H04L 29/06* | (2006.01) | |
| *H04L 9/32* | (2006.01) | |
| *G06F 16/23* | (2019.01) | |
| *H04L 9/06* | (2006.01) | |

(Continued)

(52) U.S. Cl.
CPC .............. *H04L 9/3247* (2013.01); *G06F 9/54* (2013.01); *G06F 16/2379* (2019.01); *H04L 9/0637* (2013.01); *H04L 9/30* (2013.01); *H04L 9/3242* (2013.01); *H04L 9/3297* (2013.01)

(58) Field of Classification Search
CPC ....... H04L 9/3247; H04L 9/0637; H04L 9/30; H04L 9/3242; H04L 9/3297; H04L 63/12; H04L 63/123; H04L 63/126; G06F 16/2379; G06F 9/54; G06F 21/62; G06F 21/6218; G06F 21/64
See application file for complete search history.

(56) References Cited

U.S. PATENT DOCUMENTS

| | | |
|---|---|---|
| 10,419,209 B1 * | 9/2019 | Griffin ................. H04L 9/3263 |
| 2017/0046689 A1 | 2/2017 | Lohe et al. |
| 2018/0150799 A1 | 5/2018 | Hunt et al. |

(Continued)

FOREIGN PATENT DOCUMENTS

WO    WO-2018224431 A1    12/2018

OTHER PUBLICATIONS

European Patent Office, Communication, Extended European Search Report issued for European Patent Application No. 21150794.2, dated May 18, 2021, 9 pages.

*Primary Examiner* — Malcolm Cribbs
(74) *Attorney, Agent, or Firm* — Norton Rose Fulbright US LLP

(57) ABSTRACT

The present disclosure provides systems, methods, and computer-readable storage media having functionality to prove immutability of blockchains without accessing user data. A user may submit data for storage to a data management server and the data management server may generate one or more data records corresponding to the data at a database and one or more blocks at a blockchain, each block corresponding to of the data records. Block information associated with the generated blocks may be transmitted to a remote computing device for storage at a database. Prior to storing the block information, the remote computing device may sign the data using a private key or other cryptographic technique. To validate a block, raw block information may be retrieved from the blockchain and compared to the signed block information. If the signed block information matches the raw block information, the block may be determined to be valid (e.g., unchanged).

20 Claims, 6 Drawing Sheets

(51) Int. Cl.
*G06F 9/54* (2006.01)
*H04L 9/30* (2006.01)

(56) References Cited

U.S. PATENT DOCUMENTS

| | | |
|---|---|---|
| 2019/0156429 A1 | 5/2019 | Beckmann et al. |
| 2019/0251648 A1* | 8/2019 | Liu ..................... G06Q 50/184 |
| 2019/0281066 A1 | 9/2019 | Simons |
| 2020/0036514 A1* | 1/2020 | Christensen ........ H04L 63/0823 |
| 2020/0092091 A1* | 3/2020 | Muller .................. H04L 9/0866 |
| 2020/0344062 A1 | 10/2020 | Haldar et al. |
| 2020/0394619 A1 | 12/2020 | Afaneh |
| 2022/0029792 A1* | 1/2022 | Patel ..................... G06F 21/64 |

* cited by examiner

SYSTEMS AND METHODS FOR PROVING IMMUTABILITY OF BLOCKCHAINS

CROSS-REFERENCE TO RELATED APPLICATIONS

The present application relates to commonly-owned U.S. patent application Ser. No. 16/739,088, entitled "METHODS OF PROVING THE IMMUTABILITY OF DIGITAL RECORDS," filed Jan. 9, 2020, the contents of which are expressly incorporated herein by reference.

TECHNICAL FIELD

The present application relates to blockchain technologies and more specifically to techniques and systems for proving the immutability of one or more blockchains.

BACKGROUND

Blockchain technology has rapidly advanced in recent years and is being used across a wide range of industries and use cases. One property of blockchain technology that has contributed to its rapid adoption is immutability (e.g., the ability of the blockchain to remain unchanged, unaltered, and indelible), which increases a level of trust for the blockchain (e.g., a level of trust that the data recorded to or represented on the blockchain has not been altered). Blockchains may be public or private. Public blockchains are typically decentralized and may be considered permissionless because anyone can participate (e.g., read, write, etc.) in the blockchain network and there is no centralized control of the blockchain network. On the other hand, private blockchains are typically permissioned blockchains that place restrictions (e.g., permissions) on who can participate in the blockchain network and utilize a centralized control structure. While the immutability property is important for all blockchain technologies, it is especially important for blockchains operated under a centralized control structure, such as private blockchains. Because private blockchains utilized a centralized control, it may be easier (relative to decentralized public blockchains) to alter private blockchains. Regardless of whether a blockchain is public or private, the success of the technologies developed for and the services supported by the blockchain may be dependent on the ability of users to trust the blockchain. Thus, the ability to prove immutability can increase the trustworthiness of a blockchain and promote more widespread use of blockchain technologies.

SUMMARY

Embodiments of the present disclosure provide systems, methods, and computer-readable storage media for proving immutability of a blockchain. In accordance with aspects of the present disclosure, a user may submit data to a data management server for storage. In aspects, the data may be submitted via interaction between the user and one or more application servers. Upon receiving the data, the data management server may generate one or more data records corresponding to the data at a database and one or more blocks at a blockchain, each block corresponding to of the data records. In such an arrangement, the user data may be stored separately from the information recorded to the blockchain. Block information associated with the generated blocks may be transmitted to a remote computing device for storage at a database. The block information may include a timestamp, a block identifier (ID), a blockchain ID, and a hash pointer. The remote computing device may receive the block information and sign the block information using a private key or other cryptographic technique.

To validate blocks of the blockchain, raw block information may be retrieved from the blockchain and compared to the signed block information. For example, a computing device, such as an auditor server, may transmit a request for blockchain information to the data management server responsible for maintaining the blockchain. The request may identify the block and the blockchain of interest for the validation process. Upon receiving the request, the data management server may retrieve the raw block information from the identified block and blockchain, and transmit the raw blockchain information to the computing device. The computing device may apply a public key (e.g., a public key corresponding to the private key used to generate the signed block information) to the sign block information to obtain validation data and may compare the validation data to the raw block information. If the validation data matches the raw block information, the block may be determined to be valid (e.g., unchanged). Performing validation of blocks of a blockchain in this manner enables blocks to be validated without requiring access to the user data associated with the blocks and operates on a data set that is smaller and less computationally complex than other validation techniques, which operate on hash values of blocks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
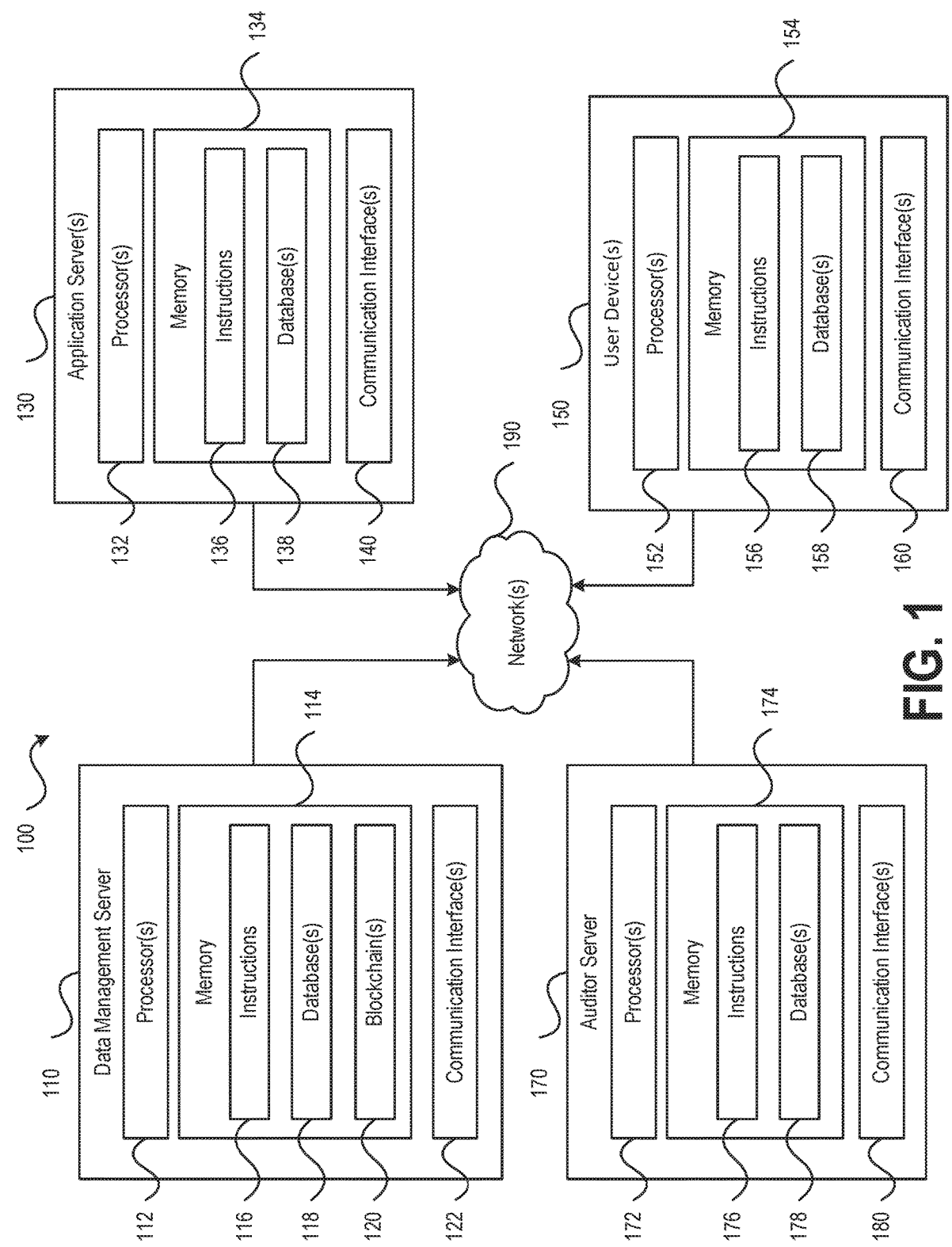
FIG. 1 is a block diagram of a system for proving the immutability of one or more blockchains in accordance with embodiments of the present disclosure.

Referring to FIG. 1, a block diagram of a system for proving the immutability of one or more blockchains in accordance with embodiments of the present disclosure is shown as a system 100. The system 100 may include a data management server 110, an application server 130, a user device 150, and an auditor server 170. The user device 150 may be configured to interact with the application server 130 to generate data, which may be provided to the data management server 110 for storage or for other purposes. For example, data generated via interaction with the application server 130 may be stored in one or more databases and information associated with the data may also be recorded to one or more blocks of a blockchain. The auditor server 170 may be configured to perform operations to prove the immutability of the blockchain. Additional details regarding the operations and functionality provided by the data management server 110, the application server 130, the user device 150, and the auditor server 170 are described in more detail below.

As shown in FIG. 1, one or more networks 190 may be provided to communicatively couple different portions of the system 100 to each other, such as to facilitate communication between the user device 150 and the application server 130, communication between the application server 130 and the data management server 110, communication between the auditor server 170 and the data management server 110, and the like. The one or more networks 190 may include wired networks, wireless networks, or combinations of wired and wireless networks operating in accordance with one or more communication protocols or standards (e.g., an Ethernet protocol, a 4$^{th}$ Generation (4G) communication standard, a 5G communication standard, an Institute of Electrical and Electronics Engineers (IEEE) 802.11 communication protocol, and the like).

The data management server 110 may be configured to perform operations for managing storage of data and creation and maintenance of one or more blockchains. The one or more blockchains supported by the data management server 110 may be private blockchains. The data stored by the data management server 110 may be generated via interaction between the user device 150 and the application server 130. For example, the application server 130 may be configured to provide one or more graphical user interfaces (GUIs) including functionality that enables a user (e.g., an operator of the user device 150) to perform a transaction (e.g., a cryptocurrency transaction), access a service (e.g., a construction management service), verify information (e.g., information previously generated and stored by the system 100), and other operations. The auditor server 170 may be configured to perform operations for proving the immutability of information recorded on the blockchains supported by the system 100. It is noted that the descriptions above provide a high level overview of the system 100 and the operations and functionality provided by the data management server 110, the application server 130, the user device 150, and the auditor server 170. Additional details regarding the system 100 and the features/functionality of the data management server 110, the application server 130, the user device 150, and the auditor server 170 are described below.

As shown in FIG. 1, the data management server 110 may include one or more processors 112, a memory 114, and one or more communication interfaces 122. The one or more processors 112 may include central processing units (CPUs), graphics processing units (GPUs), or other computing circuitry (e.g., microcontrollers, one or more application specific integrated circuits (ASICs), and the like) and may have one or more processing cores. The memory 114 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 114 may store instructions 116 that, when executed by the one or more processors 112, cause the one or more processors 112 to perform the operations described in connection with the data management server 110 with reference to FIGS. 1-6. The one or more communication interfaces 122 may be configured to communicatively couple the data management server 110 to the one or more networks 190. In addition to storing the instructions 116, the memory 114 may be configured to store one or more databases 118 and one or more blockchains 120. Exemplary aspects of the one or more databases 118 and the one or more blockchains 120 are described in more detail below.

The application server 130 includes one or more processors 132, a memory 134, and one or more communication interfaces 140. The one or more processors 132 may include CPUs, GPUs, or other computing circuitry (e.g., microcontrollers, ASICs, and the like) and may have one or more processing cores. The memory 134 may include ROM devices, RAM devices, one or more HDDs, flash memory devices, SSDs, NAS devices, other devices configured to store data in a persistent or non-persistent state, or a combination of different memory devices. The memory 134 may store instructions 136 that, when executed by the one or more processors 132, cause the one or more processors 132 to perform the operations described in connection with the application server 130 with reference to FIGS. 1-6. The one or more communication interfaces 140 may be configured to communicatively couple the application server 130 to the one or more networks 190. In addition to storing the instructions 136, the memory 134 may be configured to store one or more databases 138. Exemplary aspects of the one or more databases 138 are described in more detail below.

The user device 150 includes one or more processors 152, a memory 154, and one or more communication interfaces 160. The one or more processors 152 may include CPUs, GPUs, or other computing circuitry (e.g., microcontrollers, ASICs, and the like) and may have one or more processing cores. The memory 154 may include ROM devices, RAM devices, one or more HDDs, flash memory devices, SSDs, NAS devices, other devices configured to store data in a persistent or non-persistent state, or a combination of different memory devices. The memory 154 may store instructions 156 that, when executed by the one or more processors 152, cause the one or more processors 152 to perform the operations described in connection with the user device 150 with reference to FIGS. 1-6. The one or more communication interfaces 160 may be configured to communicatively couple the user device 150 to the one or more networks 190. In addition to storing the instructions 156, the memory 154 may be configured to store one or more databases 158. Exemplary aspects of the one or more databases 158 are described in more detail below.

The auditor server 170 includes one or more processors 172, a memory 174, and one or more communication interfaces 180. The one or more processors 172 may include CPUs, GPUs, or other computing circuitry (e.g., microcontrollers, ASICs, and the like) and may have one or more processing cores. The memory 174 may include ROM devices, RAM devices, one or more HDDs, flash memory devices, SSDs, NAS devices, other devices configured to store data in a persistent or non-persistent state, or a combination of different memory devices. The memory 174 may store instructions 176 that, when executed by the one or more processors 172, cause the one or more processors 172 to perform the operations described in connection with the auditor server 170 with reference to FIGS. 1-6. The one or more communication interfaces 180 may be configured to communicatively couple the user device 170 to the one or more networks 190. In addition to storing the instructions 176, the memory 174 may be configured to store one or more databases 178. The auditor server 170 may be operated by an entity that is different from, and independent of, the entity operating the data management server 110 and the application server(s) 130. Exemplary aspects of the one or more databases 178 are described in more detail below.

As briefly described above, the data management server 110 may be configured to create and maintain one or more blockchains 120. In an aspect, the one or more blockchains 120 may support the functionality and services provided by the application server 130. For example, the application server 130 may be configured to provide transaction-type functionality that processes payments using one or more types of currency (e.g., Bitcoin, Ethereum, fiat currency, and the like). The transaction-type functionality of the application server 130 may be integrated into a merchant's point-of-sale (POS) systems and/or website to process payments for the merchant's goods and services by customers. To illustrate, a user (e.g., an operator of the user device 150) may navigate a web browser of the user device 150 to a website of the merchant and select one or more goods or services to purchase. Once all of the goods or services have been selected by the user, the user may proceed to a checkout web page of the merchant's website to pay for the selected goods or services. The checkout web page may collect information for providing the payment and may then pass the collected payment information to the application server 130 for processing. Once processed, the application server 130 may transmit data associated with the transaction, such as information identifying the merchant, the user making the purchase, the date of the purchase, the form of payment, the amount of the payment, and other information to the data management server 110. The data management server 110 may record the transaction data to a transaction database (e.g., one of the one or more databases 118) and may create a block corresponding to the transaction on a blockchain of the one or more blockchains 120. It is noted that the block created for the transaction may not include the transaction information, but may instead include information that may be used to verify the transaction information, such as a hash value of the data stored in the transaction database. It is noted that the hash value may be generated based on other information in addition to the transaction data, such as information associated with a previous block of the blockchain. By storing the transaction data separate from the blockchain, validation of the blocks of the blockchain may be performed without requiring access to the underlying data of each block, such as the transaction data. Exemplary techniques for validating blocks of a blockchain without accessing the underlying data are described in more below.

In addition to or as an alternative to providing the above-described transaction-type functionality, the application server 130 may include functionality for managing one or more construction projects. To illustrate, suppose that a city is constructing a new road system. The city may seek bids for constructing the new road system from multiple construction companies and the bids may specify costs for various aspects of the construction process, such as costs for construction materials (e.g., concrete, equipment rentals, fuel, asphalt, rebar, and the like), labor costs (e.g., costs for workers performing the construction), or other costs. Additionally, the bids may identify each construction company that has submitted a bid, the time the bid was submitted, a schedule for completing the construction of the new road system, or other information.

The bids may be submitted to the application server 130 and provided to the data management system 110, where the bids may be stored in a construction database of the one or more databases 118 and a new block may be created at the one or more blockchains 120 for each of the received bids. As in the transaction-type example above, by storing the bids separate from the blockchain, validation of the blocks of the blockchain may be performed without requiring access to the underlying data of each block, such as the bids. Furthermore, once a bid is selected, the progress of the construction project may be tracked by providing information to the application server 130 and the progress information may also be recorded to the construction database and additional blocks corresponding to the progress information may be created at the blockchain. If a dispute ever arises regarding the progress of the construction project or the costs of the construction project, users with appropriate permissions may access the data recorded in the construction database to verify the cost reflected in the selected bid and compare the bid-cost to the cost charged by the entity associated with the selected bid. In order for such a system to work, all involved parties must have trust that none of the data has been altered, which requires the immutability of the blockchain and its history to be provable.

The information (e.g., the information associated with the data stored in the database) recorded on the blockchain may be validated or proved to be authentic and unaltered by the system 100 using the techniques described herein. Currently, techniques exist for validating individual blocks by recalculating the hash values of one or more blocks. This technique can be used to detect attempts to manipulate the blockchain due to the fact that each block comprises a hash value that is derived, at least in part on the previous block and thus, if one of the blocks changes the hash values for subsequent blocks will be incorrect (e.g., if calculated from the manipulated block). However, such techniques do not prove that the history of the blockchain has not been manipulated. Stated another way, while techniques for validating aspects of a blockchain exist, such techniques do not provide adequate measures for proving the immutability of blockchains. As described herein, techniques for proving the immutability of the blocks of the blockchain are described. Notable, the techniques disclosed herein do not require access to the data associated with the blockchain (e.g., the data recorded to the database).

With regard to the blockchains created and maintained by the data management server 110, each block may comprise a plurality of fields, such as a block identifier (ID) or block number, a timestamp that records the time the block was created, a hash value of the previous block, a data packet and a digital signature which, in one implementation may be a hash value of the entire block. The data packet may comprise a plurality of fields and the content of the data packet may depend on an application associated with creation of the block. For example, in a crypto-currency application, the data packet may consist of fields like 'From', 'To' and 'Amount', and the like. Flags may be associated with one or more of the data fields to indicate and importance of the field(s). Each of the one or more blockchains may be associated with a blockchain identifier that may be used to identify which blockchain should be accessed to evaluate a particular block. To illustrate, suppose there are two blockchains having blockchain IDs "ABC" and "DEF." Both blockchains may have a block having a block ID of "001" and the data management server 110 may be able to properly identify a particular block "001" using the blockchain ID. That is, if a request to validate block "001" on blockchain "ABC" is received, the data management server 110 may access blockchain "ABC," rather than blockchain "DEF." It is noted that the blockchain IDs (e.g., "ABC" and "DEF") and block IDs (e.g., "001") have been provided for purposes of illustration, rather than by way of limitation and that actual blockchain identifiers may be different than from the simplistic examples used to illustrate the concepts described herein. In an aspect, each blockchain of the one or more blockchains 120 may include a genesis block, which may be the first block of the blockchain, and subsequent blocks may be added to the blockchain and linked to a previous block to form a chain of blocks.

The hash value of each block may be a hash of the previous block, which may be used to verify the integrity of the entire blockchain. Exemplary techniques for verifying blocks of a blockchain based on hash values of blocks are described in U.S. patent application Ser. No. 16/739,088, the content of which is incorporated herein in its entirety. Verifying the integrity of blocks of a blockchain is useful because it enable determinations to be made regarding whether any data packets associated with one or more blocks of the blockchain have been altered, thereby establishing a technique for evaluating the trustworthiness of the blockchain. However, performing validation based on the hash values may require significantly more computation power and be more time consuming as the blockchain grows (e.g., because there is an ever increasing number of blocks that must be verified). In contrast to the above-described techniques, which rely on the hash value of the blocks to perform validation operations, the present disclosure provides techniques for validating a blockchain based on hash pointers (e.g., links between blocks).

As described above, the data management server 110 may receive a request (e.g., from the application server 130) to store data in association with a blockchain. The request may include a blockchain identifier that identifies the blockchain associated with the data or the data management server 110 may determine the blockchain associated with the data based on the particular application that generated the request. For example, if the application is a transaction-type application provided by the application server 130, the data management server 110 may associate the data with a blockchain supporting the transactions of the transaction-type application, but if the application is a construction-type application, the data management server 110 may associate the data with a construction management blockchain. It is noted that the one or more blockchains 120 may include multiple blockchains of a single type, such as multiple transaction blockchains, multiple construction management blockchains, or other types of blockchain depending on the particular services and functionality provided by the application server 130. It is also noted that although FIG. 1 illustrates a single data management server 110 and a single application server 130, the system 100 may support data management servers 110 and multiple application servers 130.

Upon receiving the request, the data management server 110 may generate a block (e.g., a new block) on the blockchain identified based on the request. The block may include a hash value corresponding to the data, a timestamp, and a block identifier. The data management 110 may also generate a hash pointer corresponding to the block. The hash pointer is different from the hash value of the block. As described above, the data received in the request may be stored in a database. In aspects, different databases may be maintained by the data management server 110 to support different applications provided by the application server 130, and there may be multiple database storing similar types of information, such as having a first transaction database storing transaction data for a first transaction service and a second transaction database storing transaction data for a second transaction service. In aspects, the data may be encrypted prior to storing the data in the database to enhance the security of the data.

After generating the block and hash pointer, the data management server 110 may transmit block information to a remote computing device. The remote computing device may be the auditor server 170 or another remote computing device, such as a public database, a file transfer protocol (FTP) server, a hypertext transfer protocol (HTTP) or HTTPs server, or another type of computing device. It is also noted that the block information may, in some aspects, be transmitted for storage in a medium other than a computing device or computer-based storage, such as a newspaper. The block information may include the hash pointer, the timestamp, the block identifier, and the blockchain identifier associated with the newly created block. In an aspect, the block information transmitted by the data management server 110 may also include the block identifier identifying the newly generated block, the time stamp corresponding to the time when the block was written to the blockchain, and the blockchain identifier identifying the blockchain where the block information is recorded.

It is noted that the block information may be transmitted to a single remote computing device(s) or destinations or may be transmitted to multiple remote computing devices or destinations. In an aspect, rather than automatically transmitting the block information for a newly generated block to the remote computing device(s) or other types of storage mediums, the remote computing device(s) may be configured to periodically poll the data management server 110 for block information generated during a period of time. For example, the auditor server 170 may be configured to periodically poll (e.g., once a day, once a week, once per hour, every 3 hours, etc.) the data management server 110 for block information that has been generated since a last polling event. Additionally or alternatively, the data management server may be configured to periodically distribute the block information for a plurality of blocks, such as to transmit block information for all blocks generated during a time period (e.g., once a day, once a week, once per hour, every 3 hours, etc.) to the remote computing devices or destinations or to transmit the block information based on a threshold number of newly generated blocks (e.g., transmit block information every time 10 new blocks are added to a blockchain). It is noted that the particular mechanisms, time periods, and threshold described above have been provided for purposes of illustration, rather than by way of limitation and that other mechanisms, time periods, and thresholds may be utilized by systems operating according to embodiments of the present disclosure.

The remote computing device may be configured to sign the block information using a private key to produce signed block information and to store the signed block information at a database. Where the block information is transmitted to the auditor server 170, the block information may be signed using a private key of the entity operating the auditor server 170 and stored at the one or more databases 178. It is noted that the auditor server 170 may maintain a single database for all blockchains the auditor server 170 is configured to audit, or may maintain separate databases for each different blockchain. Other remote computing devices receiving the block information may sign the block information using a different private key (e.g., a private key that is different from the private key of the entity operating the auditor server). In an aspect, the signed block information may be stored as a blockchain, rather than a traditional database. It is noted that although use of private keys has been described above as the technique for signing the block information, this has been provided for purposes of illustration, rather than by way of limitation and other techniques that achieve the purposes of the private key signing techniques may be used by the system 100.

Figure 2:
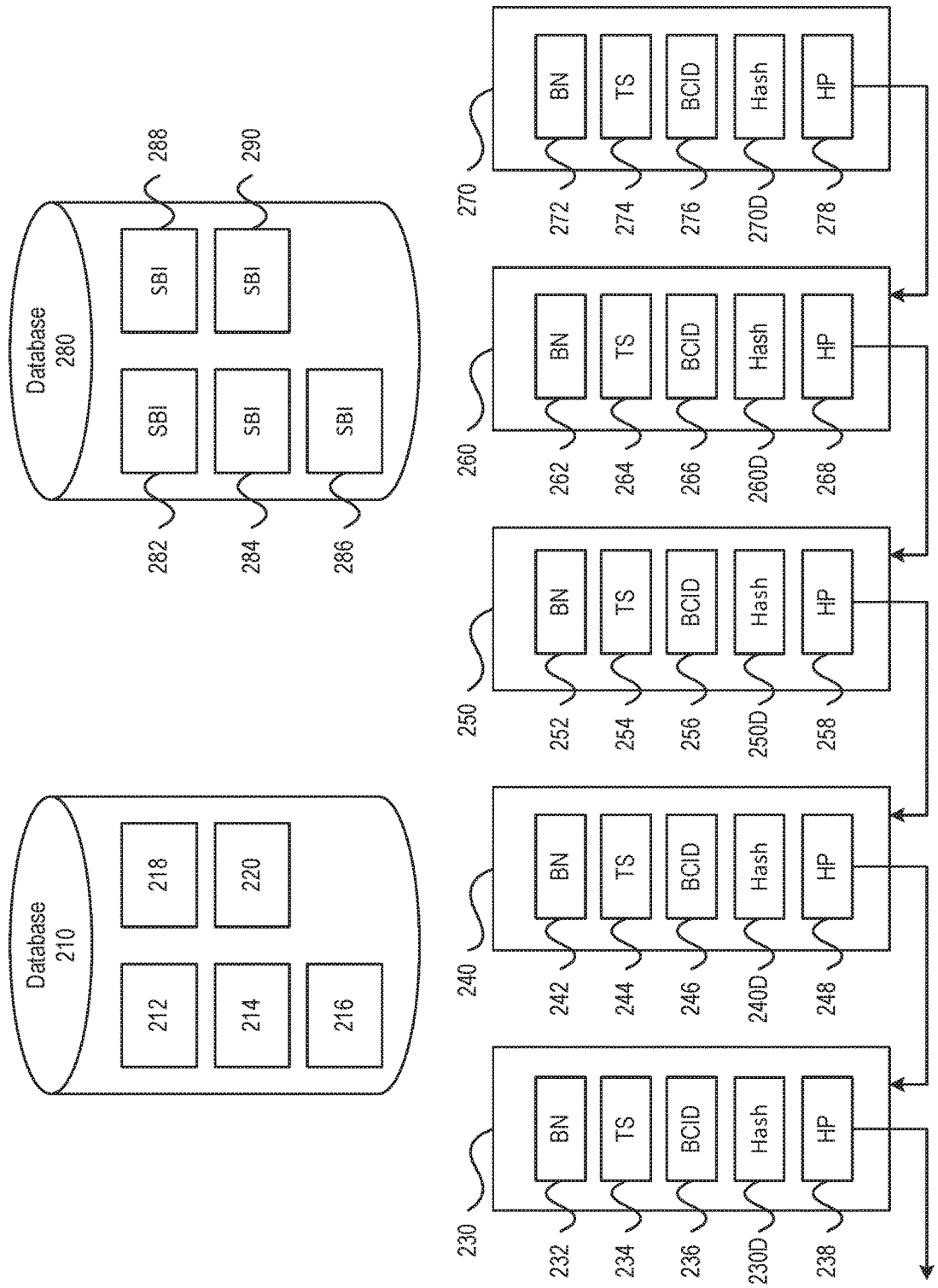
FIG. 2 is a block diagram illustrating aspects of storing information for use in performing validation of blocks of a blockchain in accordance with embodiments of the present disclosure.

The concepts described above regarding generation of blocks of the blockchain and signed block information are shown in FIG. 2, which is a block diagram illustrating aspects of storing information for use in performing validation of blocks of a blockchain in accordance with embodiments of the present disclosure. The storage techniques illustrated in FIG. 2 facilitate verification and validation of a blockchain without requiring access to user data and utilizing a more data set that requires less computationally complex operations and fewer computing resources than other validation techniques. In FIG. 2, a database 210 and a database 280 are shown. The database 210 may correspond to one of the one or more databases 118 maintained by the data management server 110 and the database 280 may correspond to a database maintained by a remote computing device (e.g., the auditor server 170) for storing signed block information. The database 210 includes data records 212, 214, 216, 218, and 220 and the database 280 includes data records 282, 284, 286, 288, 290. Additionally, FIG. 2 shown a blockchain having a plurality of blocks, including blocks 230, 240, 250, 260, 270. Each of the blocks of the illustrated blockchain includes a block number (or ID), a timestamp, a blockchain ID a have value, and a hash pointer. For example, block 230 includes a block ID 232, a timestamp 234, a blockchain ID 236 a have value 230D, and a hash pointer 238, block 240 includes a block ID 242, a timestamp 244, a blockchain ID 246 a have value 240D, and a hash pointer 248, block 250 includes a block ID 252, a timestamp 254, a blockchain ID 256 a have value 250D, and a hash pointer 258, block 260 includes a block ID 262, a timestamp 264, a blockchain ID 266 a have value 260D, and a hash pointer 268, block 270 includes a block ID 272, a timestamp 274, a blockchain ID 276 a have value 270D, and a hash pointer 278. It is noted that although the blocks of the blockchain are shown as including a blockchain ID (e.g., blockchain IDs 236, 246, 256, 266, 276), in aspects the blockchain IDs may not actually be stored within the blocks and may instead merely be determined based on the blockchain to which the blocks belong to (e.g., because all blocks on a blockchain have the same blockchain ID). For example, the blockchain may have a blockchain ID of "ABC" and each block of the blockchain may belong to the blockchain identified by blockchain "ABC."

Block 230 may be associated with data record 212, block 240 may be associated with data record 214, block 250 may be associated with data record 216, block 260 may be associated with data record 218, block 270 may be associated with data record 220. To illustrate, when data management server 110 receives data corresponding to data record 212, the data management server 110 may generate block 230 and link block 230 to a previous block (not shown in FIG. 2 for simplicity) via the hash pointer 238. The data management server 110 may perform similar operations with respect to data record 214 and block 240, data record 216 and block 250, data record 218 and block 260, and data record 220 and block 270.

As explained above, the data management server 110 may transmit block information to one or more remote devices (e.g., auditor server 170 of FIG. 1) as each of the blocks 230, 240, 250, 260, 270 is created. The remote computing device may generate signed block information based on the block information received from the data management server 110 and may store the signed block information to the database 280. To illustrate, data record 282 may correspond to signed block information associated with block 230, data record 284 may correspond to signed block information associated with block 240, data record 286 may correspond to signed block information associated with block 250, data record 288 may correspond to signed block information associated with block 260, and data record 290 may correspond to signed block information associated with block 270. As explained above, the signed block information stored in the data records 282, 284, 286, 288, 290 may be generated by signing the block information received from the data management server 110 using a private key or another cryptographic technique enabling the operations described herein. It is noted that the databases 210 and 280 are shown as including only five data records and the blockchain is shown as including only five blocks for purposes of illustration, rather than by way of limitation and that the databases represented by databases 210 and 280, as well as the illustrated blockchain may include more than five data records and corresponding blocks.

Referring back to FIG. 1, at some point in time, an entity (e.g., an entity operating the data management server 110, an entity operating the application server 130, an operator of the user device 150, or an entity operating the auditor server 170) may desire to validate one or more blocks (e.g., the blocks 230, 240, 250, 260, 270 of FIG. 2) of a blockchain (e.g., the blockchain of FIG. 2). To validate the block(s) of the blockchain, the auditor server 170 (or another device) may generate an authentication request that includes information identifying the blockchain(s) and block(s) to be validated. In an aspect, the blockchain may be identified in the request using the blockchain ID and the block may be identified using a block ID. For example, if the block to be validated id block 240 of FIG. 2, the request may include block ID 242 and blockchain ID 246. The authentication request may be transmitted to the data management server 110.

The data management server 110 may receive the authentication request and determine which blockchain the authentication request pertains to (e.g., based on the blockchain ID(s) included in the request) and which block(s) of the identified blockchain are being validated (e.g., based on the block ID(s) included in the request). Having identified the blockchain(s) and the block(s) to which the authentication request relates to, the data management server 110 may retrieve the block information corresponding the identified blockchain(s) and block(s). As described above, the block information may include the hash pointer and other metadata, such as the timestamp, the blockchain ID, and the block ID (or other information if desired). In this example, where block 240 of the blockchain of FIG. 2 is being validated, the block information may include block ID 242, timestamp 244, blockchain ID 246, and hash pointer 248.

The data management server may transmit the block information to the auditor server 170. Upon receiving the block information from the data management server 110, the auditor server 170 may initiate operations to authenticate the block of the blockchain. For example, the auditor server may retrieve the signed block information associated with data record 284, which corresponds to block 240 of the blockchain illustrated in FIG. 2 and may use the signed block information to validate the block(s). To validate the block(s), the auditor server may apply a public key (e.g., a key corresponding to the private key used to generate the signed block information 284) to the signed block information 284 to generate validation data. The auditor server 170 may then compare the validation data to the received block information and determine whether the block(s) (e.g., the block 240 of FIG. 2) a validation result based on the comparing. The comparison performed by the auditor server 170 may include comparing at least a portion of the validation data to the block identifier, the time stamp, and the blockchain identifier included in the block information to verify the block information matches the validation data. It is noted that utilization of the hash pointer, the timestamp, the blockchain ID, and the block ID to perform validation of blocks of a blockchain has been provided for purposes of illustration, rather than by way of limitation and the additional types of data may be utilized if desired. However, the hash value (e.g., the hash value 240D of FIG. 2) need not be considered, which results in a significant time savings and allows the validation techniques described herein to operate on a much more compact data set and require less computational power than validation techniques that utilize hash values.

The validation result may indicate whether the block is a valid block or an invalid block. For example, if the validation data obtained from the signed block information matches the block information received from the data management server 110, the validation result determined for the block (e.g., the block 240 of FIG. 2) may indicate the block is a valid block, and if the validation data obtained from the signed block information does not match the block information received from the data management server 110, the validation result determined for the block (e.g., the block 240 of FIG. 2) may indicate the block is an invalid block. In the context of the present disclosure, a valid block corresponds to a block of the blockchain that has not been modified during a time period since the first hash pointer was written to the database and an invalid block corresponds to a block of the blockchain that has been modified during the time period since the first hash pointer was written to the database.

In an aspect, the validation result may be determined by obtaining a hash of the block information and comparing the hash of the block information to a hash of the signed block information. For example, the public key may be applied to the signed block information to produce a validation dataset and then a hash function may be applied to the validation dataset to obtain the validation data. The hash function may also be applied to the block information to produce a candidate validation data. The candidate validation data (e.g., the hash value obtained from applying the hash function to the block information received from the data management server 110) may be compared to the hash of the validation data (e.g., the hash value obtained from applying the hash function to the validation data derived from the signed block information and the public key). It is noted that hash values derived from validation data and hash values derived from block information received from the data management server 110 may be different from the hash values stored at the blocks of the blockchain due to the different pieces of information utilized to generate these different hash values. Further, it is noted that the two hash values used to perform validation of a block in accordance with aspects of the present disclosure may be performed more rapidly than validation techniques that utilize hash values stored on the blockchain. For example, the signed block information and the block information obtained from the data management server 110 may for a very small dataset compared to the dataset used to generate the hash values stored in the blocks of the blockchain (e.g., the hash value stored at a block of the blockchain may be derived from the entire block, rather than only a small portion of the block), allowing the validation computations to be performed more rapidly and with reduced computational complexity. Additionally, by signing the block information as it is received, which will often be contemporaneously with generation of a new block of the blockchain(s), a verifiable copy of information that may be used for block validation operations may be recorded—in contrast, techniques relying on hash values stored in blocks of the blockchain may have to be re-compute hash values of many blocks to determine whether a single block has been modified (e.g., because many blockchains store hash values within blocks that are computed, at least in part, based on contents of a previous block), which is a time consuming and computationally expensive process compared to the techniques disclosed herein.

It is noted that if block information is not transmitted to the auditor server 170 (or other device(s) and destinations) contemporaneously with generation of the block to which the block information relates, there is a possibility that the block may be generated and subsequently modified prior to transmission of the block information, which may degrade the performance of the validation techniques described herein. Thus, in one embodiment, the data management server 110 may be configured to transmit the block information immediately after the generation of a new block on the blockchain. However, in some embodiments, the data management server 110 may be configured to send block information after generating multiple blocks in order to improve system performance. For example, if the data management server 110 is experiencing heavy volume (e.g., a large amount of requests are being received to write data to the one or more databases 118 and the one or more blockchains 120), the data management server 110 may implement adaptive queueing such that incoming requests are queued for processing and block information is transmitted when the queue falls below a threshold amount (e.g., 50%, 25%, 10%, or some other threshold level for the queue). In this way, data management server 110 is enabled to allocate computing resources to creating new blocks on the blockchains and storing the data in the one or more databases more quickly while still transmitting the block information to the remote computing devices and destinations shortly after the blocks are created, thus mitigating the likelihood that one of the blocks could be altered prior to transmitting the block information.

Subsequent to generating the validation result based on the comparing, the auditor device 170 or another device performing validation operations may output the validation result. For example, the validation operations may be initiated by a user of the auditor server 170 via interaction with a graphical user interface (GUI) and the validation result may be output to the GUI to inform the user of whether the block was determined to be valid or invalid. The validation results determined via the validation techniques described above may be stored at a database. For example, the auditor server 170 may be configured to store validation results at the one or more databases 178 (e.g., at a validation results database). It is noted that the one or more databases 178 may include a single validation database or may include multiple validation databases (e.g., one for each blockchain, different databases for different entities, or other combinations of databases) depending on the particular configuration of the system 100. As shown above, the validation techniques described herein enable blocks of a blockchain to be validated without accessing the data stored in association with the block, such as the data stored in the database 210 of FIG. 2.

In an aspect, the validation results may be periodically published, such as to a web page of a website associated with the auditor server 170, provided to the data management server 110, or otherwise made accessible to parties interested in the validity of the blockchain(s) managed by the data management server 110. For example, the auditor server 170 may provide a website that identifies validity results for various blockchains. The validity results may indicate how many blocks of the blockchain have been determined to be valid and invalid and may be used to inform the public of the trustworthiness of the blockchains.

In situations where a block is determined invalid, various operations may be performed depending on the configuration of the system 100 of the applications served by the system 100. For example, all blocks after the invalid block may be considered invalid and all transactions may be revoked (e.g., if the system 100 is supporting a transaction-type blockchain and transaction-type applications). As another example, a new record may be added to the blockchain to indicate agreement on the block's new hash pointer, which may be the hash pointer included in the block information received from the data management server 110 or the hash pointer included in the signed block information), and the system 100 may continue to operate on the blockchain without any blocks being considered invalid. In some instances, additional transactions may be recorded on the blockchain to fix errors, if any, introduced by the invalid block. It is noted that the remediation operations described above for handling invalid blocks of the blockchain have been provided for purposes of illustration, rather than by way of limitation and that other types of error-state processing operations may be provided by systems operating in accordance with embodiments of the present disclosure.

In an aspect, the data management server 110 may be configured to provide application programming interface functionality that enables the GUI to make calls to the API to retrieve block information from the one or more blockchains 120 without accessing the data records stored in the one or more databases 118. For example, where the authentication request is provided via a call or calls to the API, the auditor server 170 (or another computing device) may be configured to submit the authentication request via a call to the API that passes the blockchain ID and the block ID as parameters. The data management server 110 may be configured to detect calls to the API and provide the block information when the API calls are received. Additionally or alternatively, the data management server 110 may not be configured to support requests for block information over a network and the block information may be retrieved locally. For example, the entity operating the auditor server 170 may visit a physical location associated with the data management server 110, such as a headquarters or data center of the entity operating the data management server 110, and retrieve the block information by connecting to the network infrastructure of the physical location.

It is noted that the validation request may be generated by the auditor server 170 (or another device) based on request from a user, such as the user associated with the user device 150. For example, where the blockchain supports a construction project, a user (e.g., a contractor involved in the project) may hire one or more sub-contractors to perform certain parts of the construction project and may receive information that one of the sub-contractors has not been paid. The user may review records in a database (e.g., the one or more databases 158) to see if the payment has been made (or is appropriate to be paid if it has not been). If the payment was made, the user may interact with the auditor server 170 via a website or other type of graphical user interface or with an API similar to the API described above to validate the block associated with the payment data record and prove that the payment has been made. For example, if the block associated with the payment to the sub-contractor is determined to be invalid, the user may suspect that the block has been altered, such as to alter the block to reflect that payment has not been made, and may contact the operator of the data management server to verify the payment status using the data record stored at the one or more databases 118 corresponding to the block being validated. The operator of the data management server 110 may transmit the data record to the user, which may indicate that the payment was made. In an aspect, the user may be granted permission to access the data records of the database so that the user can verify the data record contents without requiring effort on the part of the operator of the data management server 110. It is noted that although this example describes accessing the data record, such access is performed to identify the reasons why the block was determined to be invalid, rather than to make the validity determination. Thus, it is to be appreciated that the validation techniques described herein may be performed without accessing the data records associated with the blocks of the blockchain.

Figure 5:
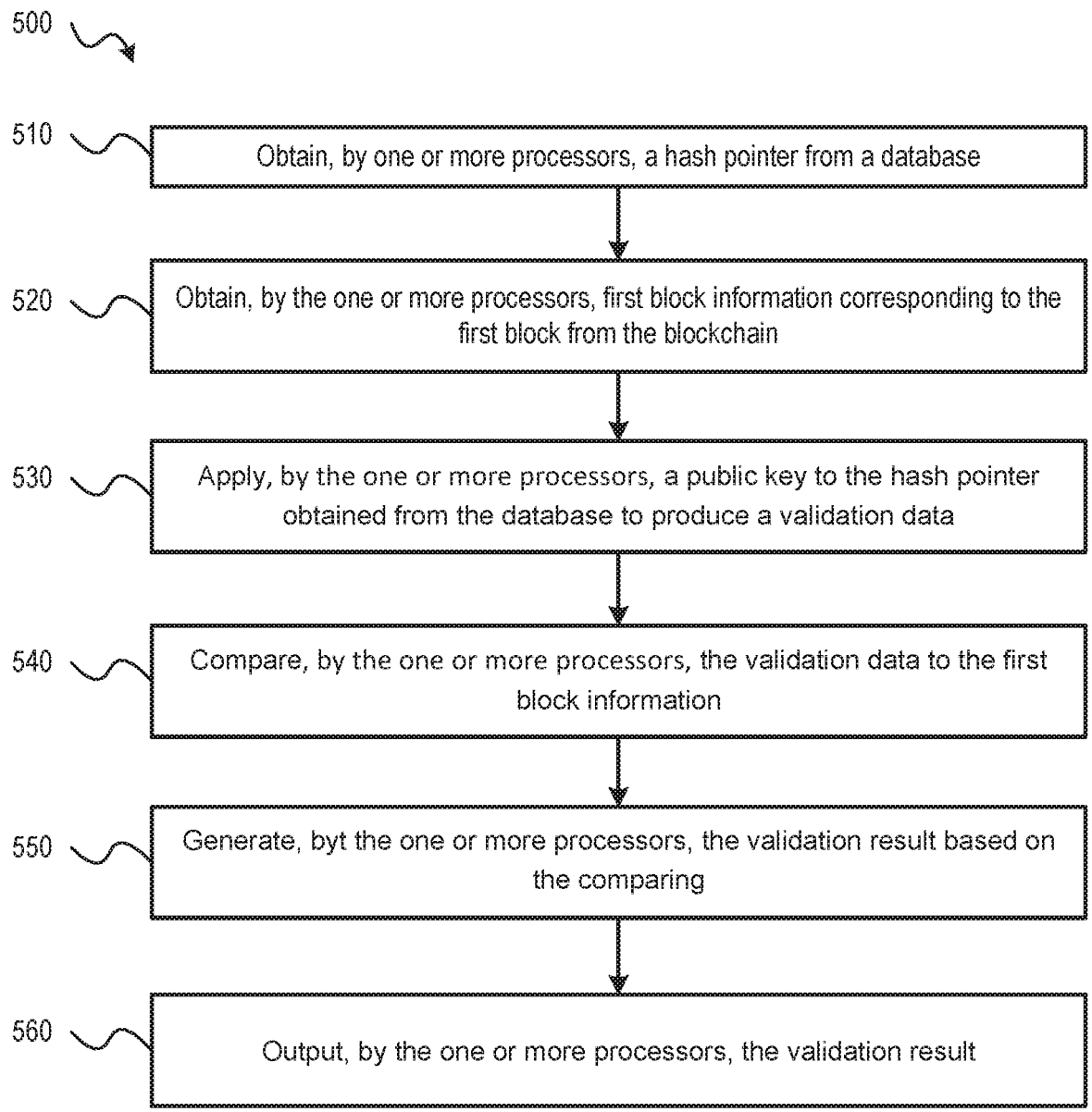
FIG. 5 is a flow diagram illustrating an exemplary method for proving immutability of a blockchain in accordance with embodiments of the present disclosure.

In addition to maintaining databases storing data records corresponding to user data and maintaining the one or more blockchains, the data management server 110 may be configured to maintain a database or similar data handling system reflecting the latest status of the data tracked in the sequence of blocks in the system shown in FIG. 5 in order to handle query requests or support verification during the write/update requests. The database or similar data handling system can provide various semantics and interfaces such as ACID semantics, SQL interface, loos consistency models, Key/Value store interfaces, and linear serializability consistency model, etc. The status database described above may contain only data that has been generated or inferred from the blockchain and the information recorded at the blocks of the blockchain (e.g., transactions, etc.). The status database may not include any of the data stored at the database of information corresponding to the blocks of the blockchain, such as the information recorded in a transaction database (e.g., records indicating the "to," "from," "amount," fields, etc.), thereby protecting the blockchain's underlying data and information.

Figure 3:
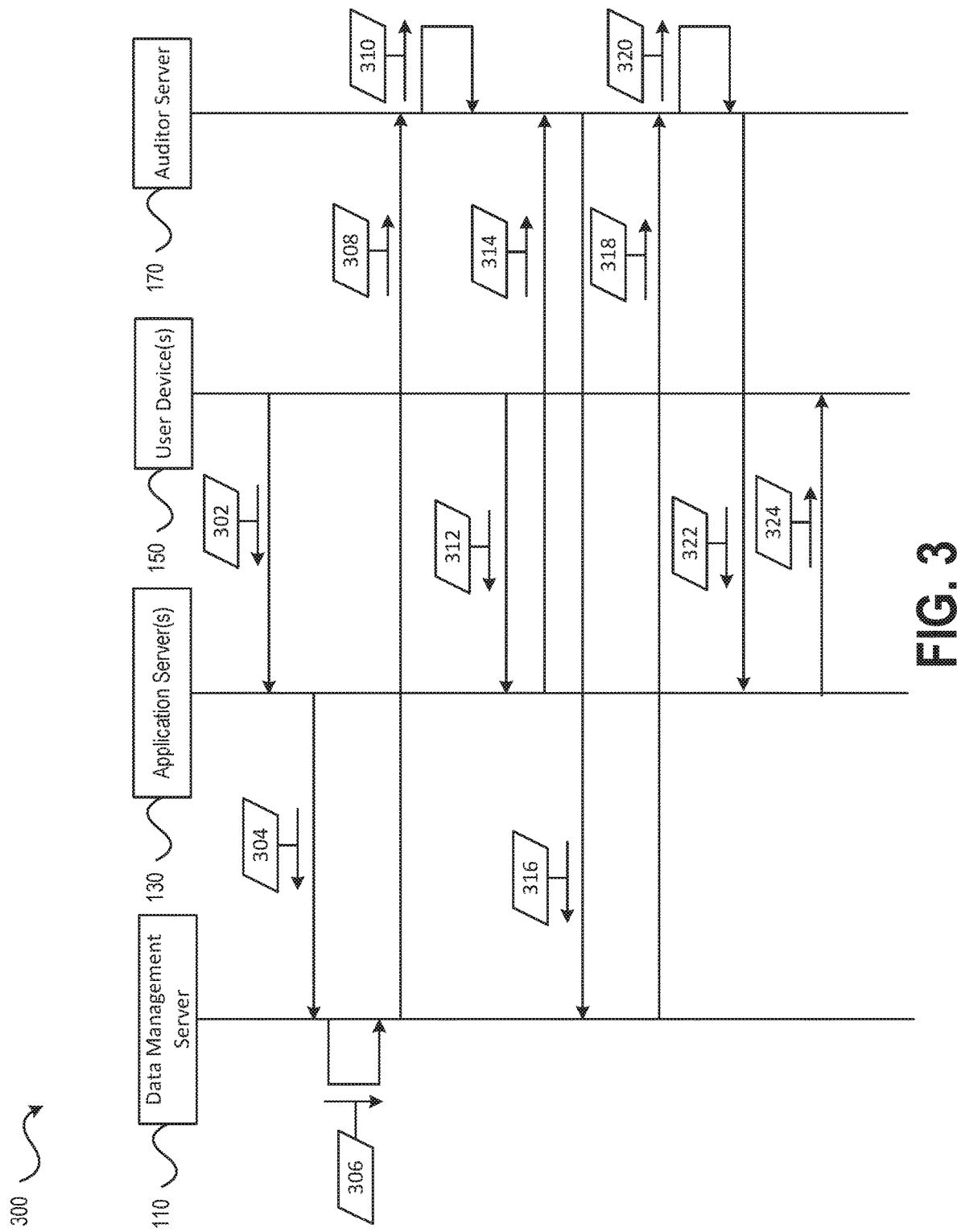
FIG. 3 is a ladder diagram of a process for generating and validating blocks of a blockchain in accordance with embodiments of the present disclosure.

The concepts described above are further illustrated in FIGS. 3 and 4, which show ladder diagrams of processes for generating and validating blocks of a blockchain in accordance with embodiments of the present disclosure. In FIG. 3, the data management server 110, the application server 130, the user device 150, and the auditor server 170 of FIG. 1 are shown. During generation of a block on the blockchain, the user device 150 may transmit data 302 to the application server 130. The data 302 may comprise information input into one or more forms or other techniques for collecting information from the user device 150. The application server 130 may transmit a storage request 304 to the data management server 110. The storage request 304 may include at least a portion of the data 302 as well as additional information, such as information identifying a blockchain or an application, which may be used by the data management server 110 to determine which blockchain should be used during processing of the storage request 304.

As described above, upon receiving the storage request 304, the data management server 110 may generate data 306, which may include generating a new data record at a database (e.g., the one or more databases 118 of FIG. 1 or the database 210 of FIG. 2) and generating a new block on a blockchain (e.g., the one or more blockchains 120, or one of the blocks 230, 240, 250, 260, 270 of FIG. 2). Subsequent to generating the new block and corresponding data record, the data management server 110 may transmit block information 308 to the auditor server 170. The auditor server 170 may sign the block information to produce signed block information 310 and may store the signed block information 310 at a database (e.g., the one or more database 178 of FIG. 1 or the database 280 of FIG. 2).

The user may subsequently provide additional data 312 to the application server 130 and based on the additional data 312, the application server 130 may transmit an audit request 314 to the auditor server 170. The auditor server 170 may receive the audit request 314 from the application server 130 and may transmit a validation request 316 to the data management server 110. The audit request 316 may request block information for a particular block or set of blocks of a blockchain, as described above. Upon receiving the validation request 316, the data management server 110 may transmit block information 318 to the auditor server 170. As described above, the block information 318 may include the block ID, blockchain ID, timestamp, and hash pointer for the block(s) identified in the validation request 316.

The auditor server 170 may receive the block information 318 from the data management server 110 and perform validation operations as described above. For example, the auditor server 170 may apply a public key to the signed block information 310 to produce validation data 320 and compare the validation data 320 to the block information 318 to determine a validity result, which may indicate the block is valid or invalid. The auditor server 170 may be configured to provide the validity result 322 to the application server 130 and the application server 130 may transmit a validation status message 324 to the user device 150.

The exemplary flow illustrated in FIG. 3 may be suitable for transaction processing-type blockchain applications. For example, the application server 130 may be configured to provide functionality for performing financial transactions and the data management server 110 may be configured to maintain account information for participating users. In such an arrangement, the data 302 may be a request to perform a transaction and the validity result 322 may indicate whether the transaction should be authorized (e.g., when the validity determination is made to evaluate whether the user has sufficient funds in an account maintained by the data management server 110 to complete the transaction). It is noted that the exemplary processing flows described above have been provided for purposes of illustration, rather than by way of limitation and that other processing flows achieving the same functionality may be readily apparent to a person of ordinary skill in the art. For example, the application server 130 could transmit the additional data 304 to the auditor server 170 and the auditor server 170 could then initiate the request for the block information.

Figure 4:
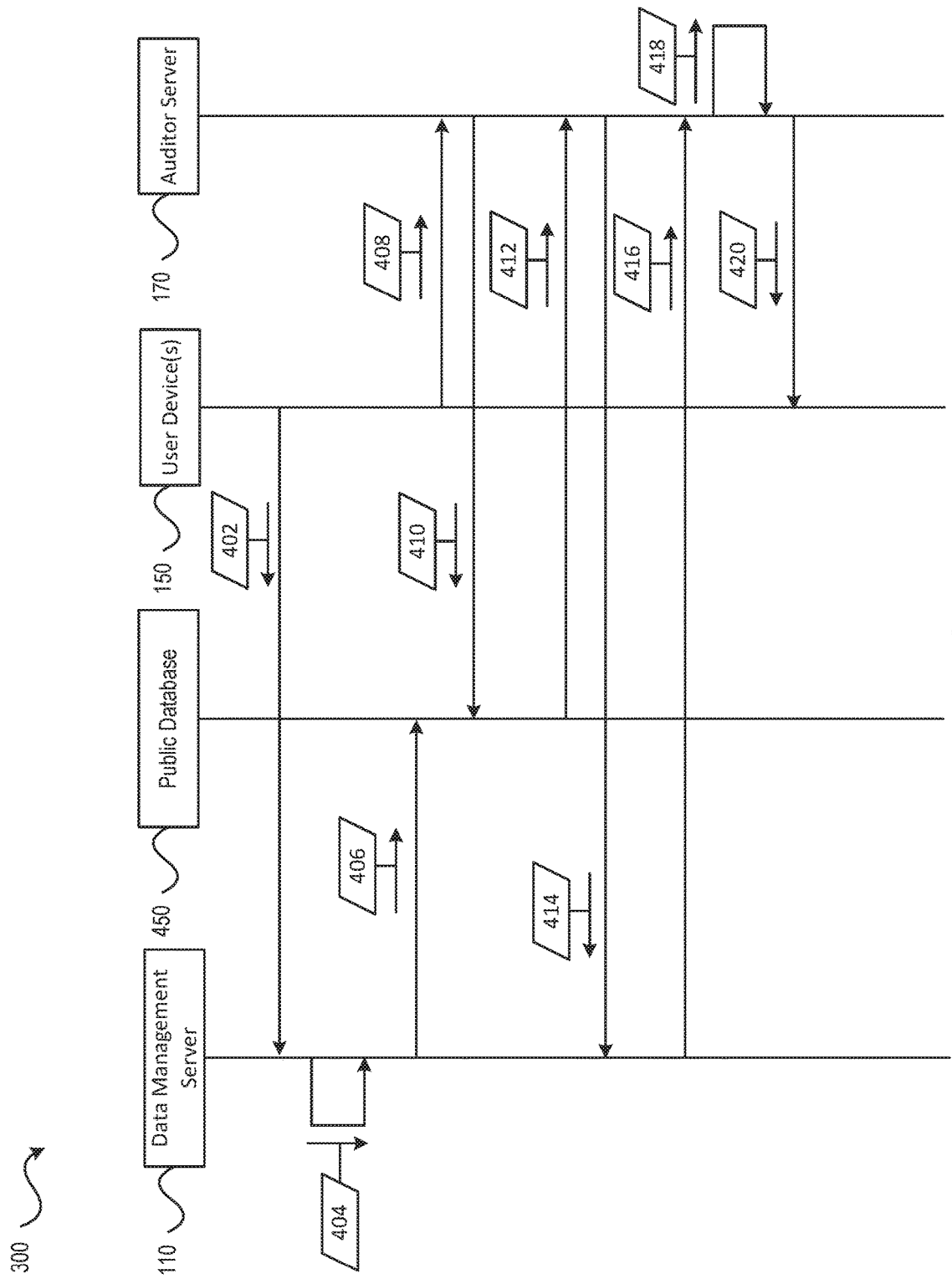
FIG. 4 is another ladder diagram of a process for generating and validating blocks of a blockchain in accordance with embodiments of the present disclosure.

In FIG. 4, the data management server 110, the user device 150, and the auditor server 170 of FIG. 1 are shown. Additionally, a public database 450 is shown. The public database may be a blockchain or may be a collection of data records accessible using a primary key or other indexing system. The user device 150 may provide data 402 to the data management server 110. Although not shown in FIG. 4, the data 402 may be provided to the data management server 110 via the application server 110, as described above. Upon receiving the data 402, the data management server 110 may generate data 404, which may include generating a new data record at a database (e.g., the one or more databases 118 of FIG. 1 or the database 210 of FIG. 2) and generating a new block on a blockchain (e.g., the one or more blockchains 120, or one of the blocks 230, 240, 250, 260, 270 of FIG. 2). Subsequent to generating the new block and corresponding data record, the data management server 110 may transmit block information 406 to the public database 450. The public database 450 may be configured to provide a public repository for block information generated by the data management server 110. The public database 450 or a server associated with the public database 450 may be configured to sign the block information 406, as described above.

Subsequently, the user device 150 may transmit an audit request 408 to the auditor server 170. The auditor server 170 may receive the audit request 408 from the user device 150 and may transmit a signed block information request 410 to the public database 450 and a validation request 414 to the data management server 110. The signed block information request may request the signed block information from the public database for a particular block or set of blocks of a blockchain and the audit request 414 may request block information (e.g., raw or unsigned block information) for the particular block or set of blocks of the blockchain. Upon receiving the signed block information request 410, the public database 450 may transmit signed block information 412 to the auditor server and the data management server 110, upon receiving the validation request 414, may transmit block information 416 to the auditor server 170. As described above, the block information 416 may include the block ID, blockchain ID, timestamp, and hash pointer for the block(s) identified in the validation request 414.

The auditor server 170 may receive the signed block information 412 from the public database 450 and the block information 416 from the data management server 110 and perform validation operations as described above. For example, the auditor server 170 may apply a public key to the signed block information 412 to produce validation data 418 and compare the validation data 418 to the block information 416 to determine a validity result, which may indicate the block is valid or invalid. The auditor server 170 may be configured to provide the validity result 420 to the user device 150. As shown in FIG. 4, the auditor server 170 may be configured to utilize a public database (e.g., the public database 450) rather than maintaining its own databases to perform validity analysis operations according to aspects of the present disclosure. In such an arrangement, the auditor server 170 may be configured to obtain a public key corresponding to the private key associated with the public database 450 from a key server (not shown in FIG. 4). Thus, it is to be understood that multiple parties may perform validation operations according to the techniques disclosed herein without requiring each of those parties to maintain their own databases of signed block information.

Referring to FIG. 5, a flow diagram illustrating an exemplary method for proving immutability of a blockchain in accordance with embodiments of the present disclosure is shown as a method 500. In aspects, steps of the method 500 may be stored as instructions (e.g., the instructions 176 of FIG. 1) that, when executed by one or more processors (e.g., the one or more processors 172 of FIG. 1), cause the one or more processors to perform operations for proving the immutability of a blockchain. In aspects, the method 500 may be performed by a computing device configured to audit the validity of a blockchain, such as the auditor server 170 of FIGS. 1, 3, and 4.

At step 510, the method 500 includes obtaining, by one or more processors, a hash pointer from a database. The hash pointer retrieved from the database may correspond to a first hash pointer of the blockchain associated with the first block and may be digitally signed using a private key. For example, the retrieval of the hash pointer, at step 510, may be retrieved from a local (e.g., local to the device performing step 510 of the method 500) database as illustrated and described with reference to 310, 320 of FIG. 3 or as illustrated and described with reference to 410, 412 of FIG. 4. At step 520, the method 500 includes obtaining, by the one or more processors, first block information corresponding to the first block from the blockchain. The first block information includes at least the first hash pointer of the blockchain and the first hash pointer is different from a hash value of the first block. As described above, the block information may also include a block ID, a blockchain ID, and a timestamp.

At step 530, the method 500 includes applying, by the one or more processors, a public key to the hash pointer obtained from the database to produce a validation data. As described herein, the public key corresponds to the private key. At step 540, the method 500 includes comparing, by the one or more processors, the validation data to the first block information. The comparing may be configured to compare the hash pointer obtained from the signed block information to the hash pointer included in the first block information. Additionally, the timestamps, blockchain IDs, and block IDs obtained from the signed block information may be compared to the timestamps, blockchain IDs, and block IDs obtained from the first block information.

At step 560, the method 500 includes generating, by the one or more processors, the validation result based on the comparing. The validation result may indicate whether the first block identified by the first hash pointer is a valid block or an invalid block. As used herein, a valid block corresponds to a block of the blockchain that has not been modified during a time period since the first hash pointer was written to the database (e.g., as signed block information) and an invalid block corresponds to a block of the blockchain that has been modified during the time period since the first hash pointer was written to the database. At step 570, the method 500 includes outputting, by the one or more processors, the validation result. As described above, the validation result may be output to a database or blockchain, a GUI, or output as a message to a computing device (e.g., the data management server 110, the application server 130, the user device 150, or another computing device).

Figure 6:
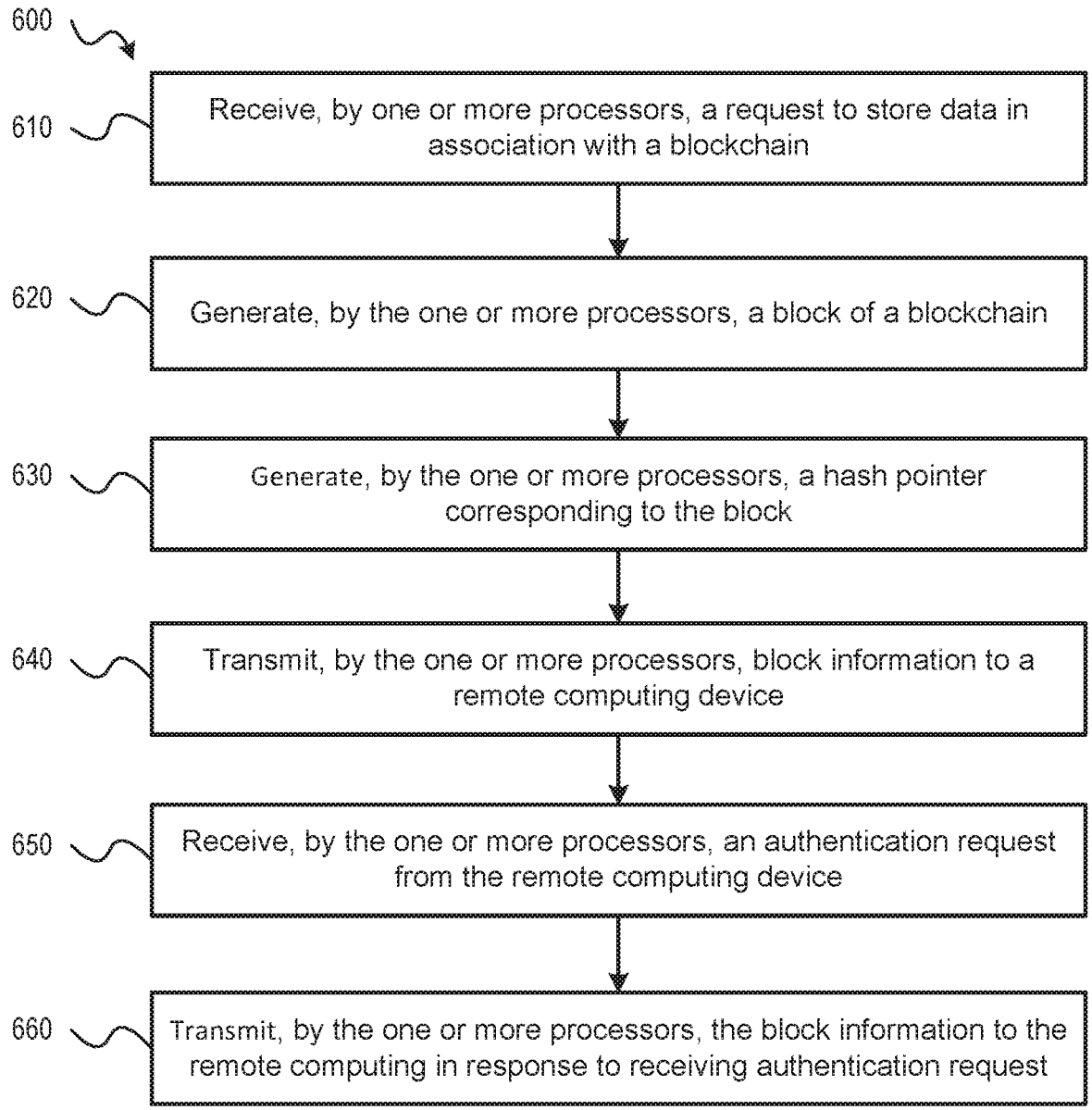
FIG. 6 is another flow diagram illustrating another exemplary method for proving immutability of a blockchain in accordance with embodiments of the present disclosure.

Referring to FIG. 6, a flow diagram illustrating another exemplary method for proving the immutability of a blockchain is shown as a method 600. In aspects, steps of the method 600 may be stored as instructions (e.g., the instructions 116 of FIG. 1) that, when executed by one or more processors (e.g., the one or more processors 112 of FIG. 1), cause the one or more processors to perform operations for proving the immutability of a blockchain. In aspects, the method 600 may be performed by a computing device configured to generate and maintain at least one blockchain, such as the data management server 110 of FIGS. 1, 3, and 4.

At step 610, the method 600 includes receiving, by one or more processors, a request to store data in association with a blockchain. As described above, the request may include a blockchain identifier that identifies the blockchain or the blockchain may be identified via another technique, such as an application that generated the request. In an aspect, the request may be the request 304 of FIG. 3. At step 620, the method 600 includes generating, by the one or more processors, a block of a blockchain. The block may include a hash value, a timestamp, and a block identifier. At step 630, the method 600 includes generating, by the one or more processors, a hash pointer corresponding to the block. The hash pointer is different from the hash value of the block.

At step 640, the method 600 includes transmitting, by the one or more processors, block information to a remote computing device. The block information may include the hash pointer, the timestamp, the block identifier, and the blockchain identifier, and the remote computing device may be configured to sign the block information using a private key to produce signed block information. The remote computing device may also be configured to store the signed block information at a database, as described above.

At step 650, the method 600 includes receiving, by the one or more processors, an authentication request from the remote computing device. In an aspect, the authentication request may be received as described with reference to the requests 316 and 414 of FIGS. 3 and 4, respectively. At step 660, the method 600 includes transmitting, by the one or more processors, the block information to the remote computing in response to receiving authentication request. As describe above, the remote computing device may configured to authenticate the block of the blockchain based on the signed block information, a public key corresponding to the private key, and the block information without accessing the data stored in association with the block.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-6) may comprise processors, electronics devices, hardware devices, electronics components, logical circuits, memories, software codes, firmware codes, etc., or any combination thereof. In addition, features discussed herein relating to FIGS. 1-6 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIG. 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for proving immutability of a blockchain, the method comprising:
    receiving, by one or more processors, a request to validate a first block of the blockchain, wherein:
        the request includes a particular block identifier and a particular blockchain identifier; and
        the blockchain includes a plurality of blocks that includes the first block, each block of the plurality of blocks including a block identifier, a time stamp, and a blockchain identifier;
    retrieving, by the one or more processors, a hash pointer from a database based at least in part on the particular block identifier and the particular blockchain identifier included in the request, wherein the hash pointer retrieved from the database corresponds to a first hash pointer of the blockchain associated with the first block and is digitally signed using a private key;
    obtaining, by the one or more processors, first block information corresponding to the first block from the blockchain, wherein the first block information comprises at least the first hash pointer of the blockchain, and wherein the first hash pointer is different from a hash value of the first block;
    applying, by the one or more processors, a public key to the hash pointer obtained from the database to produce a validation data, the public key corresponding to the private key;
    comparing, by the one or more processors, the validation data to the first block information;
    generating, by the one or more processors, a validation result based on the comparing, wherein the validation result indicates whether the first block identified by the first hash pointer is a valid block or an invalid block, wherein a valid block corresponds to a block of the blockchain that has not been modified during a time period since the first hash pointer was written to the database and an invalid block corresponds to a block of the blockchain that has been modified during the time period since the first hash pointer was written to the database; and
    outputting, by the one or more processors, the validation result.

2. The method of claim 1, wherein the first block information comprises a first block identifier identifying the first block, a first time stamp corresponding to a time when the first block was written to the blockchain, and a first blockchain identifier identifying the blockchain.

3. The method of claim 2, wherein the comparing further comprises comparing at least a portion of the validation data to the first block identifier, the first time stamp, and the first blockchain identifier to verify the first block information matches the validation data.

4. The method of claim 1, further comprising:
    generating, by the one or more processors, a request to obtain the first block information from the blockchain, wherein the blockchain is identified by the particular blockchain identifier; and
    transmitting, by the one or more processors, the request to obtain the first block information to the blockchain identified by the particular blockchain identifier.

5. The method of claim 4, wherein the request to obtain the first block information is transmitted to the blockchain via an application programming interface (API), wherein the API is configured to enable retrieval of hash pointers and metadata from the blockchain without providing access to data corresponding to the plurality of blocks of the blockchain.

6. The method of claim 1, wherein the database comprises a public database.

7. The method of claim 1, wherein the blockchain comprises a private blockchain.

8. The method of claim 7, wherein each block of the plurality of blocks further includes a hash value and a hash pointer corresponding to a second block of the blockchain, the hash value corresponding to a hash of data associated with the second block, and wherein the data associated with the second block is stored external to the blockchain.

9. A system for proving immutability of a blockchain, the system comprising:
 a memory; and
 one or more processors configured to:
  receive a request to validate a first block of the blockchain, wherein:
   the request includes a particular block identifier and a particular blockchain identifier; and
   the blockchain includes a plurality of blocks that includes the first block, each block of the plurality of blocks including a block identifier, a time stamp, and a blockchain identifier;
  retrieve a hash pointer from a database based at least in part on the particular block identifier and the particular blockchain identifier included in the request, wherein the hash pointer retrieved from the database corresponds to a first hash pointer of the blockchain associated with the first block and is digitally signed using a private key;
  obtain first block information corresponding to the first block from the blockchain, wherein the first block information comprises at least the first hash pointer of the blockchain, and wherein the first hash pointer is different from a hash value of the first block;
  apply a public key to the hash pointer obtained from the database to produce a validation data, the public key corresponding to the private key;
  compare the validation data to the first block information;
  generate a validation result based on the comparing, wherein the validation result indicates whether the first block identified by the first hash pointer is a valid block or an invalid block, wherein a valid block corresponds to a block of the blockchain that has not been modified during a time period since the first hash pointer was written to the database and an invalid block corresponds to a block of the blockchain that has been modified during the time period since the first hash pointer was written to the database; and
  output the validation result.

10. The system of claim 9, wherein the first block information comprises a first block identifier identifying the first block, a first time stamp corresponding to a time when the first block was written to the blockchain, and a first blockchain identifier identifying the blockchain.

11. The system of claim 10, wherein the one or more processors compares the validation data to the first block information by comparing at least a portion of the validation data to the first block identifier, the first time stamp, and the first blockchain identifier to verify the first block information matches the validation data.

12. The system of claim 9, wherein the one or more processors are further configured to:
 generate, by the one or more processors, a request to obtain the first block information from the blockchain, wherein the blockchain is identified by the particular blockchain identifier; and
 transmit, by the one or more processors, the request to obtain the first block information to the blockchain identified by the particular blockchain identifier.

13. The system of claim 12, wherein the request to obtain the first block information is transmitted to the blockchain via an application programming interface (API), wherein the API is configured to enable retrieval of hash pointers and metadata from the blockchain without providing access to data corresponding to the plurality of blocks of the blockchain.

14. The system of claim 9, wherein the database comprises a public database.

15. The system of claim 14, wherein each block of the plurality of blocks further includes a hash value and a hash pointer corresponding to a second block of the blockchain, the hash value corresponding to a hash of data associated with the second block, and wherein the data associated with the second block is stored external to the blockchain.

16. The system of claim 9, wherein the blockchain comprises a private blockchain.

17. A non-transitory computer-readable storage medium storing instructions that, when executed by one or more processors, cause the one or more processors to perform operations for proving immutability of a blockchain, the operations comprising:
 receiving a request to validate a first block of the blockchain, wherein:
  the request includes a particular block identifier and a particular blockchain identifier; and
  the blockchain includes a plurality of blocks that includes the first block, each block of the plurality of blocks including a block identifier, a time stamp, and a blockchain identifier;
 retrieving a hash pointer from a database based at least in part on the particular block identifier and the particular blockchain identifier included in the request, wherein the hash pointer retrieved from the database corresponds to a first hash pointer of the blockchain associated with the first block and is digitally signed using a private key;
 obtaining first block information corresponding to the first block from the blockchain, wherein the first block information comprises at least the first hash pointer of the blockchain, and wherein the first hash pointer is different from a hash value of the first block;
 applying a public key to the hash pointer obtained from the database to produce a validation data, the public key corresponding to the private key;
 comparing the validation data to the first block information;
 generating a validation result based on the comparing, wherein the validation result indicates whether the first block identified by the first hash pointer is a valid block or an invalid block, wherein a valid block corresponds to a block of the blockchain that has not been modified during a time period since the first hash pointer was written to the database and an invalid block corresponds to a block of the blockchain that has been modified during the time period since the first hash pointer was written to the database; and
 outputting the validation result.

18. The non-transitory computer-readable storage medium of claim 17, wherein the first block information comprises a first block identifier identifying the first block, a first time stamp corresponding to a time when the first block was written to the blockchain, and a first blockchain identifier identifying the blockchain.

19. The non-transitory computer-readable storage medium of claim 17, wherein the operations further comprise:
- generating, by the one or more processors, a request to obtain the first block information from the blockchain, wherein the blockchain is identified by the particular blockchain identifier; and
- transmitting, by the one or more processors, the request to obtain the first block information to the blockchain identified by the particular blockchain identifier.

20. The non-transitory computer-readable storage medium of claim 17, wherein the database comprises a public database, and wherein the blockchain comprises a private blockchain.

\* \* \* \* \*